United States Patent
Wrage et al.

(10) Patent No.: US 7,287,481 B1
(45) Date of Patent: Oct. 30, 2007

(54) LAUNCH AND RETRIEVAL ARRANGEMENT FOR AN AERODYNAMIC PROFILE ELEMENT AND AN AERODYNAMIC PROFILE ELEMENT

(75) Inventors: Stephan Wrage, Hamburg (DE); Stephan Brabeck, Hamburg (DE)

(73) Assignee: Skysails GmbH & Co. KG, Hamburg (DE)

( * ) Notice: Subject to any disclaimer, the term of this patent is extended or adjusted under 35 U.S.C. 154(b) by 0 days.

(21) Appl. No.: 11/529,902

(22) Filed: Sep. 29, 2006

Related U.S. Application Data

(63) Continuation of application No. PCT/EP06/008049, filed on Aug. 15, 2006.

(51) Int. Cl.
*B63H 9/04* (2006.01)

(52) U.S. Cl. ................................. 114/102.29

(58) Field of Classification Search ............ 244/153 R; 114/102.1, 102
See application file for complete search history.

(56) References Cited

U.S. PATENT DOCUMENTS

| | | | | |
|---|---|---|---|---|
| 4,363,458 A | * | 12/1982 | Jones et al. ............. | 244/153 R |
| 5,201,482 A | * | 4/1993 | Ream ......................... | 244/145 |
| 5,244,169 A | * | 9/1993 | Brown et al. ............... | 244/146 |
| 7,104,504 B2 | | 9/2006 | Peterson et al. | |
| 2003/0106479 A1 | * | 6/2003 | Suh ....................... | 114/102.11 |
| 2003/0140835 A1 | * | 7/2003 | Wrage .................... | 114/102.1 |
| 2005/0011425 A1 | * | 1/2005 | Suh ......................... | 114/39.14 |
| 2006/0065787 A1 | | 3/2006 | Peterson et al. | |

FOREIGN PATENT DOCUMENTS

| | | |
|---|---|---|
| DE | 199 61 035 A1 | 7/2001 |
| DE | 101 09 640 C1 | 6/2002 |
| FR | 2837166 A1 | 9/2003 |
| WO | WO 2005/100147 A1 | 10/2005 |
| WO | WO 2005/100150 A1 | 10/2005 |
| WO | WO 2006/027194 A1 | 3/2006 |
| WO | WO 2006/027195 A1 | 3/2006 |

* cited by examiner

*Primary Examiner*—Stephen Avila
(74) *Attorney, Agent, or Firm*—Leydig, Voit & Mayer, Ltd.

(57) ABSTRACT

The invention relates to an aerodynamic profile element for energy production using traction force, in particular for driving watercraft. The invention further relates to a launch and retrieval arrangement for a profile element, and a drive arrangement for a watercraft including the profile element and the launch and retrieval arrangement.

25 Claims, 7 Drawing Sheets

Figure 1:
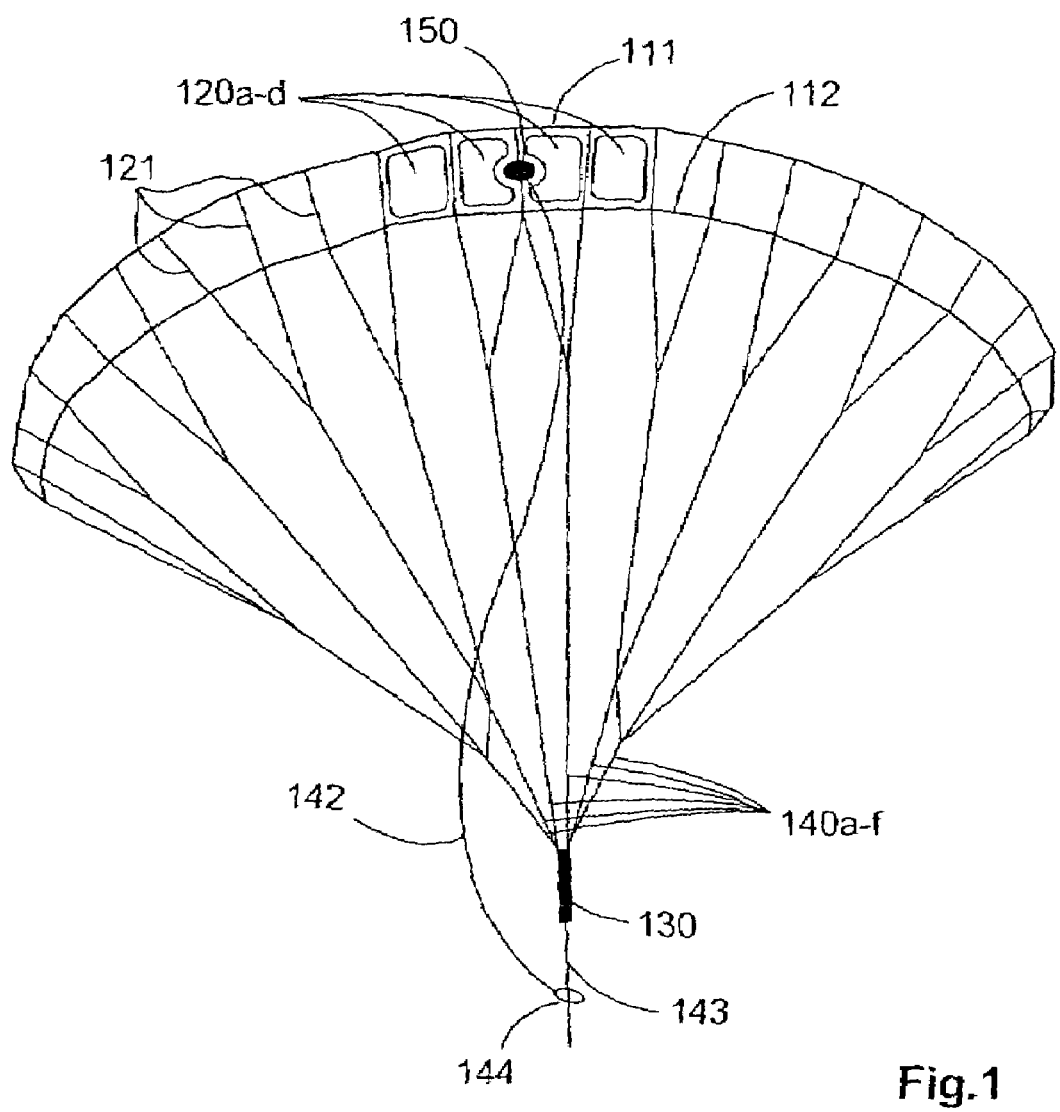

LAUNCH AND RETRIEVAL ARRANGEMENT FOR AN AERODYNAMIC PROFILE ELEMENT AND AN AERODYNAMIC PROFILE ELEMENT

CROSS REFERENCE OF RELATED APPLICATIONS

This application is a continuation application of PCT/EP2006/008049, filed on Aug. 15, 2006, which is hereby incorporated by reference.

BACKGROUND OF THE INVENTION

The invention concerns an aerodynamic profile element for energy production by means of traction force, in particular for driving watercraft, including:

(a) an upper flexible layer which extends in a transverse direction and a longitudinal direction, (b) a lower flexible layer which extends parallel to the upper layer and which is connected to the upper layer by means of a plurality of webs extending in the depthwise direction of the profile element, (c) an air-filled internal space between the upper and lower layers, (d) at least one air intake opening for supplying air to the internal space, said opening being arranged between two mutually parallel leading edges of the upper and lower layers, (e) a plurality of pulling lines which are fixed with a first end to spaced locations on the profile element and which are connected with a second end to a pulling cable for connecting the profile element to a watercraft, and (f) a plurality of reefing lines which are fixed at a first end to the layers and/or webs and which are adapted to reduce or increase the size of the profile element by reefing or unreefing the upper and lower layers.

A further aspect of the invention is a launch and retrieval arrangement for a profile element according to the preceding paragraph, wherein the profile element has a bar element extending in the longitudinal direction and the launch and retrieval arrangement includes a mast, to the upper end of which is fixed a mast head, and a coupling device which is arranged at the mast head and which is rotatable about a vertical axis for coupling the leading end of the profile element to the mast head.

In the context of the reduction in the availability of and the increase in the cost of fossil fuels there is a great demand for alternative arrangements for generating energy from renewable energy sources, in particular for example as drive arrangements for watercraft. WO 2006/027194 and WO 2006/027195 disclose a novel drive arrangement for watercraft, which substantially comprises an aerodynamic profile element in the form of a kite of the kind set forth in the opening part of this specification, which can be launched from and retrieved by the watercraft by means of a launch and retrieval arrangement of the kind set forth in the opening part of this specification.

International patent application PCT/EP2005/004186 discloses a setting system for such an aerodynamic profile element which has an azimuthally pivotable holding means. PCT/EP2005/004183 also discloses a positioning apparatus for such an aerodynamic profile element, which includes a winch which permits the aerodynamic profile element to be pulled in or paid out when the tensile force in the pulling cable is less than or exceeds a predetermined value respectively.

Such profile elements and setting systems are used in particular as a ship drive arrangement but basically they can also be used for generating energy, for example electrical energy, by the pulling cable force being put to use for generating energy by a cycle of paying out and pulling in the pulling cable. For that purpose the profile elements can be used in a stationary condition on land or also in a stationary or mobile condition at sea.

The technologies described in the above-indicated publications involve basic approaches which are required for driving a watercraft with an aerodynamic profile element, in particular a kite. A fundamental problem which has to be resolved for economic implementation of the drive concept in relation to relatively large watercraft by means of captive, free-flying aerodynamic profile elements is that the size of the profile element, which is required to produce a sufficient drive force, does not permit the control procedures known from the sporting area to be adopted, or permits them to be adopted only to a limited extent. In particular, the procedure for launching and retrieving relatively small kites cannot be adopted for the substantially larger aerodynamic profile elements which are required for providing economic ship drive. The launch process and retrieval of the large aerodynamic profile elements represents a particular challenge in terms of implementing the drive concept involved.

A first problem which is involved here is that the wind conditions which prevail in the proximity of the ground make it difficult to produce a stable flight position for the profile element as the wind conditions are often too weak and, in addition, are inconsistent in respect of strength and direction. That makes the profile element more difficult to control, the lower it is flying.

One object of the invention is to develop the drive system in such a way that a reliable implementation of the launch and retrieval procedure is achieved.

A further problem occurring prior to launch and after retrieval of the profile element is that it must be brought from a packed configuration which is as compact as possible into the deployed configuration and vice-versa. That procedure is typically referred to as unreefing and reefing.

In that respect, an aerodynamic profile element of the kind set forth in the opening part of this specification typically extends substantially in a transverse direction and in that case is curved from the center towards the ends in each transverse direction about a longitudinal axis which is perpendicular to the transverse direction. The profile element typically extends by a smaller amount in the direction of the longitudinal axis than in the transverse direction. Finally the structure of the profile element comprising two layers which are arranged in mutually parallel relationship provides a depthwise extent which is perpendicular to the transverse and longitudinal direction and is typically a fraction of the extent in the transverse and longitudinal directions. In longitudinal section, the depthwise extent typically changes over the length of the profile element and forms an aerofoil cross-section with an upper lower-pressure side and a lower higher-pressure side, which is shaped to produce lift.

In accordance with a further aspect, another object of the invention is to provide a profile element which permits efficient unreefing and reefing from a packed state into a deployed state and vice-versa.

A further problem of the profile elements of large dimensions is that of specifically and deliberately stabilising or destabilising the contour of the profile element. That is typically effected by filling the internal space of the profile with air or emptying air therefrom, preferably air under an increased pressure with respect to the atmosphere. In accordance with still a further aspect, an object of the invention is to reliably implement that stabilisation and destabilisation of the profile element even in relation to profile elements of larger dimensions.

A further problem which is related to the launch and retrieval procedure is that control of the profile element in the region in the proximity of the ground cannot be reliably implemented solely by means of the pulling cable and suitable control measures on the profile element itself. In particular specific and targeted actuation of a coupling device in that way is scarcely possible if the profile element is of larger dimensions. It is known from the above-mentioned patent applications to use for that purpose a guide cable which is connected to the profile element and which can be connected to a launch and retrieval arrangement in the launch and retrieval process respectively in order to guide the profile element. Admittedly, control of the profile element in the region in the proximity of the ground can be improved by means of that guide arrangement, but handling of the profile element is a very complicated procedure by virtue of the need to pull in or pay out the pulling cable, the guide cable and additional reefing lines in parallel and time-matched relationship and controlling those procedures is susceptible to error. In accordance with a further aspect an object of the invention is to simplify control of the profile element in the proximity of the ground and in particular guiding the profile element to the ship-mounted part of the coupling device.

A further object of the invention is to increase the flight safety of the profile element, in particular in relation to other aircraft which are flying in the air space above the driven watercraft.

These and other aims are achieved with the invention. In accordance with a first aspect of the invention there is provided an aerodynamic profile element of the kind set forth in the opening part of this specification, which is developed by a bar element extending in the longitudinal direction of the profile element to stabilise the aerodynamic profile, wherein the bar element is fixed to the upper and/or lower layer and/or to a web and at the bar element at least one of the reefing lines experiences a change in direction from a reefing line portion which extends in the transverse direction of the profile element of the upper or lower layer respectively from the fixing point at the first end, into a reefing line portion which extends in the longitudinal direction.

In that respect the reefing lines can be in the form of lines which are substantially stiff in the longitudinal direction, that is to say not stretchable, or in the form of lines which are elastic in the longitudinal direction over the entire length or in the region of individual portions thereof.

The profile element according to the invention has a bar element which extends in the longitudinal direction and thus stabilises the contour of the profile element in the longitudinal direction. That bar element is preferably arranged centrally in the transverse direction and also centrally in the depthwise direction between the upper and lower layers of the profile element. The reefing lines are preferably deflected by means of deflection rollers at the bar element. That makes it possible for a change in the direction of the reefing lines to occur at a stable fixed point within the profile element so that the reefing lines can be guided in the internal space or however outside the profile element in the longitudinal direction or a longitudinal-transverse direction from the bar element to a fixing point on the profile element. After deflection at the bar element, the reefing lines can be guided in the longitudinal direction along the bar element and passed out of the profile element for example at the leading edge. That provides for a clever guidance effect which is immune from unwanted tangles and cable jams while in addition the reefing lines are easier to operate.

In accordance with a first development it is preferred that the bar element extends only over a part of the length of the layers, in particular only over a third of the length of the layers. That development makes it possible for the profile element to be reefed from a deployed state involving a long longitudinal extent into a packed state which is reduced to a longitudinal extent which corresponds to the length of the shortened bar element and thus permits a packaging dimension which is considerably reduced in respect of length, in comparison with a profile element with a bar element over the entire length thereof. This development is based on the realisation that deflection of the reefing lines at the bar element and the possibility of the reefing lines being arranged to be oriented in the lengthwise/transverse direction means that there is no need for the reefing lines to be caused to extend exactly in the longitudinal direction but diagonally extending portions do not impede reefing and unreefing. Alternatively in this embodiment the reefing lines can also extend in the longitudinal direction, in which case the reefing lines are guided to the centre in the rear region of the profile element and are there deflected into a transverse direction, in a region which is not stabilised by the bar element. When those reefing lines are reefed, they cause an immediate reduction in the length of the profile element in the longitudinal direction, which is often advantageous in terms of the landing operation.

It is further preferred if at least one reefing line portion which extends in the transverse direction of the upper or lower layer respectively extends at least in a portion inclinedly relative to the transverse direction in such a way that when a pull is applied to that reefing line portion reefing of the layers occurs in the transverse and longitudinal direction. The fact that the reefing lines extend diagonally at least in portion-wise manner in that way means that reefing is effected with a reefing line both in the longitudinal direction and also in the transverse direction, and that can result in a reduction in the number of reefing lines and a consequential simplification in the reefing operation.

In that respect it is particularly preferred for that embodiment to be combined with the embodiment having a reduced-length bar element, in particular a bar element which is reduced in length to a third of the length, in order thereby to achieve the compact packing arrangement of the profile element, which is possible by virtue of the reduced length of the bar element, by means of the diagonally extending reefing line portions.

A further development of the profile element according to the invention provides at least two reefing line portions which are fixed to the profile element and which are connected together and are reefed and unreefed over a roller which runs at the reefing line portions and to which a common reefing line continuation is fixed. In that way a kind of cable balance means is inserted into the reefing lines. The cable balance means which is designed in that way makes it possible to provide for variable reefing of two reefing lines which are fixed to the profile element, in which a pulling force is applied to one reefing line continuation for reefing purposes and that pulling force is transmitted to the two reefing line portions by way of the cable balance means in such a way that, with a temporary increased resistance in one of the reefing line portions, only the correspondingly other reefing line portion is pulled in so that the risk of tearing the reefing lines can be reduced.

In that respect it is particularly preferable to provide a plurality of such cable balance means and in particular the cable balance means can be provided in a cascaded arrangement, that is to say two reefing line continuations are in turn connected together in the manner of the reefing line portions and coupled by way of a cable balance means to a continuation of the reefing line continuation, and so forth.

In accordance with a further aspect of the invention a development of the profile element set forth in the opening part of this specification or the above-described profile elements provides a central reefing cable, to the first end of which all second ends of the reefing lines are connected, wherein the central reefing cable or the second end of the reefing lines extends/extend in a direction which is disposed in relation to the transverse direction of the profile element in the axis of symmetry, of said axis of symmetry, from the leading end of the profile element, and the central reefing cable is releasably fixed with its second end between the first and second ends of the central pulling cable in such a way that the central reefing cable can serve as a guide cable for the launch and retrieval of the profile element.

That development makes it possible to dispense with the separate guide cable which is required in accordance with the state of the art. Instead, the profile element can be guided in the manner required in the proximity of the ground, by way of the central reefing cable. That aspect of the invention is based on the realisation that, when retrieving the profile element, typically until the profile element is coupled to the ship-mounted part of the coupling device, on the one hand there is a resistance to reefing which is caused by the internal space of the profile element being filled, and that resistance permits guidance by means of the central reefing cable without unwanted excessive reefing occurring, and on the other hand specifically controlled reefing of the profile element in the retrieval operation is often also advantageous prior to coupling to the ship-mounted part of the coupling device and thus can be favourably tolerated, even if it occurs when the profile element is being guided by way of the central reefing cable.

In that respect the central reefing cable can be releasably coupled to the pulling cable by means of a coupling device. The coupling device can be coupled to a fixed position on the pulling cable, preferably the coupling device being so designed that the second end is fixed to the pulling cable in such a way that it can slide along the pulling cable.

A further development of the above-mentioned profile element provides that there is a cable clamping device in the region of the profile element, which is adapted to releasably clamp the central reefing cable or the reefing lines. That cable clamping device makes it possible to prevent inadvertent reefing or unreefing of the profile element in the phase in which the profile element is being guided by means of the central reefing cable, by the reefing lines or the central reefing cable being blocked in the region of the profile element.

In that respect it particularly preferred if the profile element has a bar element extending in the longitudinal direction and the cable clamping device is self-clamping when there is a pull at the central reefing cable, it is fixed to the bar element in the region of the leading edge of the profile element and it is coupled to actuating means which permit opening of the cable clamping device. That development makes it possible for cable clamping of the reefing lines or the central reefing cable to be controlled from the outside. Thus for example the cable clamping effect can be removed in the state of being coupled to the ship-mounted part of the coupling device, so that the clamping action is operative until coupling occurs or immediately after decoupling, and thus inadvertent unreefing/reefing is prevented, but after coupling or prior to decoupling reefing or unreefing of the profile element is possible in the coupled state. In particular it can be provided that the actuating means are actuated automatically upon coupling to the ship-mounted part of the coupling device so that the clamping effect is automatically removed.

In accordance with the invention in a further aspect there is provided a profile element of the kind set forth in the opening part of this specification or the above-described kind, in which the internal space has at least one vent opening and a closure device for variably closing the at least one vent opening.

That aspect of the invention is based on the realisation that, in the case of profile elements of relatively large dimensions, reefing is impeded in particular by virtue of the fact that the air in the internal space cannot escape in the required fashion. In order to counteract that disadvantage but at the same time not to worsen the flight properties and the profile stability of the profile element, the profile element has the variably closable vent opening. In that way, when reefing of the profile element is desired, the vent opening can be opened and in that way the air in the internal space can be discharged therefrom more quickly but in the flying condition the vent opening can be kept closed, whereby the profile of the profile element is stabilised.

In that respect it is particularly preferred if the vent opening is in the form of an elongate slit, a respective elastically deformable bar element is fixed along at least one edge of the opening and preferably along both edges of the vent opening, an opening cable being fixed to the two ends of the bar element in such a way that when a pull is applied to the opening cable the bar element is elastically curved and thereby the vent opening is opened. That development provides a specific structure which on the one hand satisfies the demands in terms of lightweight construction of the profile element and which on the other hand permits reliable opening and closing of the vent opening. In that respect the bar element can be fixed in various ways along the longitudinal edges of the slit and optionally the bar elements can also be fixed to each other, for example the bar elements can be hingedly or rigidly coupled together at their ends so that the result is an elliptical or lens-shaped opening when two bar elements are arranged in both longitudinal edges of the slit.

In the embodiments with a vent opening it is particularly preferred if the vent opening is arranged in a region which in the flying condition of the profile element is arranged in a lower-pressure region outside the profile element, in particular in the region between the trailing edges of the layers or in the upper layer. This arrangement of the vent openings provides that the air in the internal space is particularly quickly discharged therefrom and it can thus considerably speed up the reefing operation, in particular in the case of profile elements of large dimensions.

In accordance with a further aspect of the invention, a development of a profile element as set forth in the opening part of this specification or a profile element as described hereinbefore provides that the region between the leading edges of the upper and lower layers has a plurality of air intake openings around the longitudinal centreline of the profile element and is closed in the outer region. It has been found that, contrary to the design configuration of kites on a smaller scale, the aerodynamics and flight stability of kites of larger dimensions can be improved by the openings in the leading edge of the kite or the profile element occupying only a portion of that longitudinal edge, in particular a portion arranged around the longitudinal centreline, whereas other regions and in particular the predominant part of the leading longitudinal edge is closed.

In that respect it is particularly preferred if the air intake openings occupy 10-30%, preferably 30% of the leading wind attack surface, that is to say the front face or aerofoil leading edge of the aerodynamic profile element.

It is further preferred if the air intake openings are held open by means of slats. In that respect the configuration of those air intake openings which are held open by means of slats can be adapted for example to the configuration of the above-described vent openings or can have recourse to a plurality of bar elements which are coupled together and are disposed along the edges of the air intake openings.

In accordance with a further aspect of the invention a development of the profile element of the kind set forth in the opening part of this specification or the above-described kind provides that at least one and preferably a plurality of signal devices, preferably self-lighting signal elements, are arranged at the pulling cable. It is possible in that way to ensure that other aircraft do not miss seeing the pulling cable extending from the profile element to the watercraft and thus the operational safety of the overall system can be enhanced. In that respect, particularly for operation at night, it is preferable to use self-lighting signal elements, that is to say signal elements which are coupled to a power source and thereby produce light.

In that respect it can be particularly provided that the signal devices have red and white signal elements, preferably self-lighting allround position lights, which are fixed to the pulling cable alternately at a spacing of about 100 meters.

In the situation where the signal means are self-lighting it is preferable for the signal means to be inductively coupled to a current-carrying line extending in the pulling cable for energy supply. That kind of energy supply on the one hand is particularly reliable and on the other hand in that respect uses the transmission of electrical power by way of the pulling cable, which is often required in any case for control procedures on the profile element, in particular in a gondola disposed beneath the profile element.

In accordance with a further aspect of the invention a development of the launch and retrieval arrangement as set forth in the opening part of this specification provides that the coupling device includes a receiving space which is delimited by two vertically extending side walls and in which the leading end of the bar element can be received and which is delimited towards a first horizontal rear side by an abutment wall and towards a second horizontal front side which is in opposite relationship thereto and upwardly is open for the introduction of the leading end of the bar element from the side or above.

The coupling device provided in that way is a departure from the previous view that particularly reliable launch and particularly reliable retrieval of the profile element is made possible in particular when the profile element is held in a fixed and defined position. Rather, this development of the invention is based on the realisation that the loads on the individual component parts of the overall system, in particular the bar element of the profile element, can be considerably reduced if a certain mobility of the profile element is made possible even in the coupled state.

In addition the launch and retrieval arrangement of that configuration allows the launch and retrieval of the profile element to be effected in a large number of flight positions and flight directions of the profile element. The upwardly and forwardly open configuration of the receiving space means that the bar element can be coupled and uncoupled both from above and also from the front. That is advantageous in terms of a series of launch and retrieval manoeuvres.

In that respect the receiving space is preferably delimited by side walls which are preferably shaped in the manner of a funnel in order to facilitate retrieval of the profile element and introduction, which is linked thereto, of the bar element into the receiving space.

In accordance with a first advantageous embodiment a development of the launch and retrieval arrangement according to the invention provides that the coupling device includes a horizontal and/or vertical axis about which the bar element can pivot in the coupled condition. That development provides for defined pivotal movement of the profile element and in particular the bar element. In that respect the horizontal axis can be embodied in terms of apparatus structure as a component part within the coupling device or however it can be embodied in the form of a virtual axis by the co-operation of levers and the like.

In that respect it is particularly preferred if the axis is coupled to a spring element and/or a damper element for the elastic return of the coupled bar element into a reference angular orientation or for damping of the pivotal movement of the bar element. It has been found that free mobility for a controlled launch and retrieval procedure should preferably be limited on the one hand in such a way that high levels of acceleration and high speeds in respect of that pivotal movement are not achieved while on the other hand a return force for returning the bar element to the desired reference position is applied. That can be achieved by means of the configuration with damping and elastic return.

A further development of the launch and retrieval arrangement according to the invention is afforded by a locking device for locking the bar element in a vertically and/or horizontally oriented angular position. That makes it possible, for example after complete reefing of the profile element, to maintain the angular orientation of the bar element in relation to the mast in a fixed position and thereby to prevent unwanted pivotal movement in a vertical plane.

In that case the locking device can include in particular a horizontally displaceable closure element which closes the upper opening region of the receiving space in a locking arrangement and opens it in an unlocking arrangement.

In accordance with a further preferred embodiment a development of the launch and retrieval device can provide that at least one cover flap is arranged at the mast head, in particular at the coupling device, for covering the air intake opening or openings of the profile element when the bar element is coupled to the mast head. That cover flap prevents the dynamic pressure produced by the air intake openings of the profile element in the interior of the profile element further stabilising the profile and thus making the reefing operation more difficult, when the profile element is disposed in the region of the mast head or is coupled to the mast head. In that respect it can be provided in particular that there is a cover flap for each of the air intake openings of the profile element, which cover flaps can preferably rotate in the same manner as the coupling device about a vertical axis of the mast head and possibly a horizontal axis in order to be arranged in front of the air intake openings in any coupling condition.

In order not to impede operation of the driven watercraft once launch has been effected, the mast can be adapted to be hingeable about at least one axis in order to turn it round completely or at least over a part of its height and to reduce its height. In accordance with a further development of the launch and retrieval arrangement, alternatively or in addition to the above-mentioned hinge option, the mast is telescopically extendable and retractable. In that way the launch height required for profile elements of larger dimensions can be reliably achieved without large-size mast arrangements which interfere with the rest of the operation of the ship having to be installed.

A further aspect of the invention is a drive arrangement for a ship craft including a profile element and a launch and retrieval arrangement of the above-described kind, in which the mast is arranged in the bow region of the ship and the pulling cable is pivoted to a hauling point in the bow region of the ship, which in the direction of travel is arranged approximately a third of the length of the profile element in front of the mast. It has been found that the hauling point, that is to say the location at which the pulling cable is fixed to the watercraft or is diverted to a fixing location, is preferably arranged at a given relationship of a third in relation to the length of the profile element from the mast anchorage point on the watercraft. It is assumed in that respect that the mast extends perpendicularly. That spacing permits both a reliable launch procedure and also a reliable retrieval procedure as neither the launch operation nor the retrieval operation involves relatively high guide forces being transmitted to the profile element by way of the mast head, but rather the pulling cable of the free-flying, captive profile element substantially holds the profile element at a suitable spacing relative to the mast head when the pulling cable is being correspondingly hauled in.

BRIEF DESCRIPTION OF THE SEVERAL VIEWS OF THE DRAWING(S)

Figure 2:
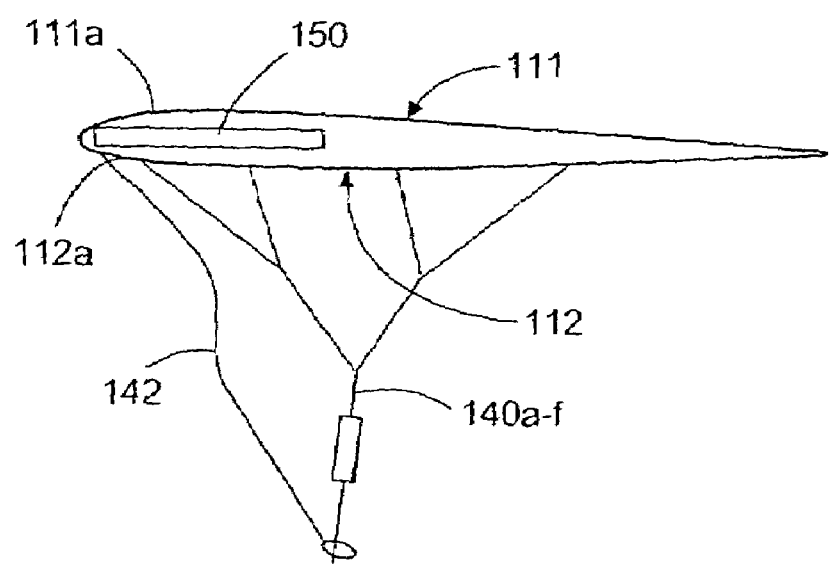
Figure 3:
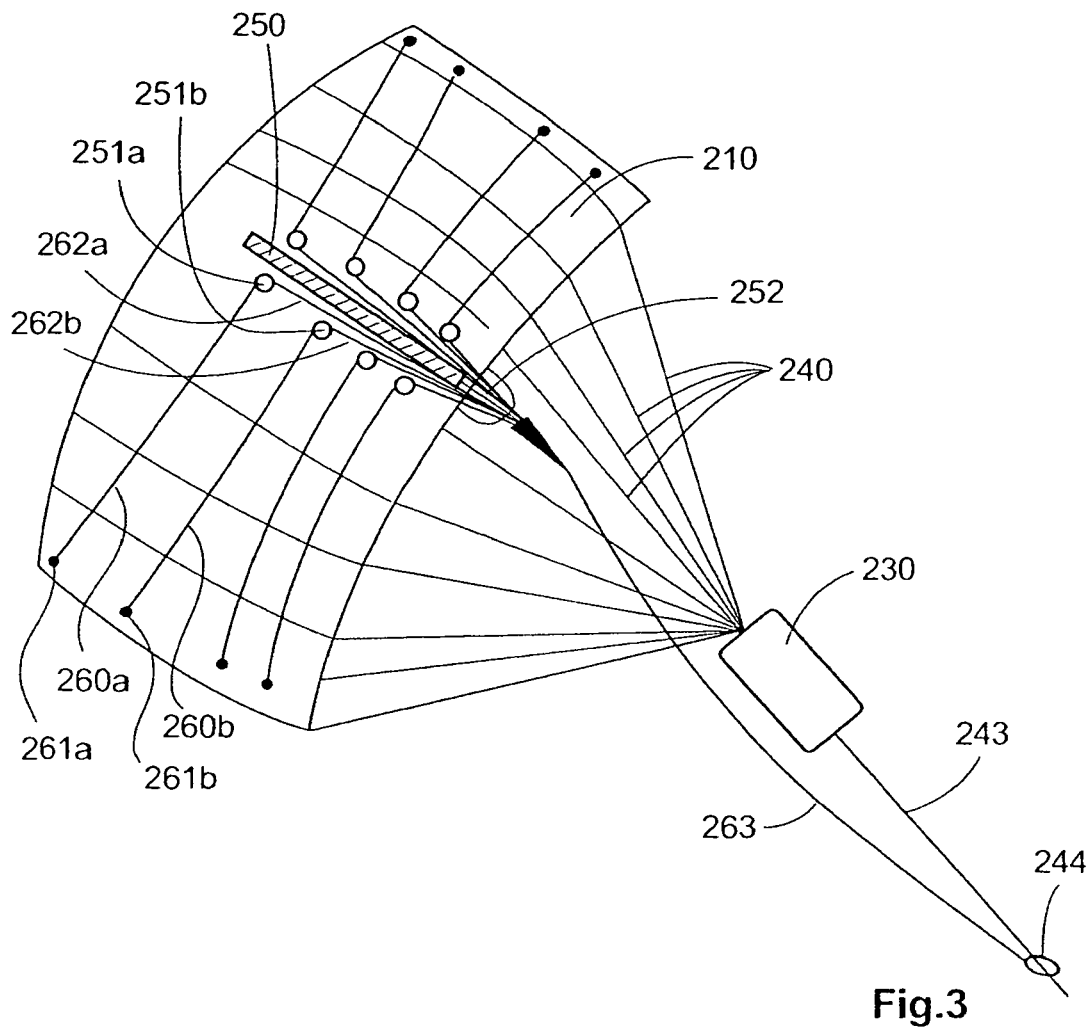
Figure 4:
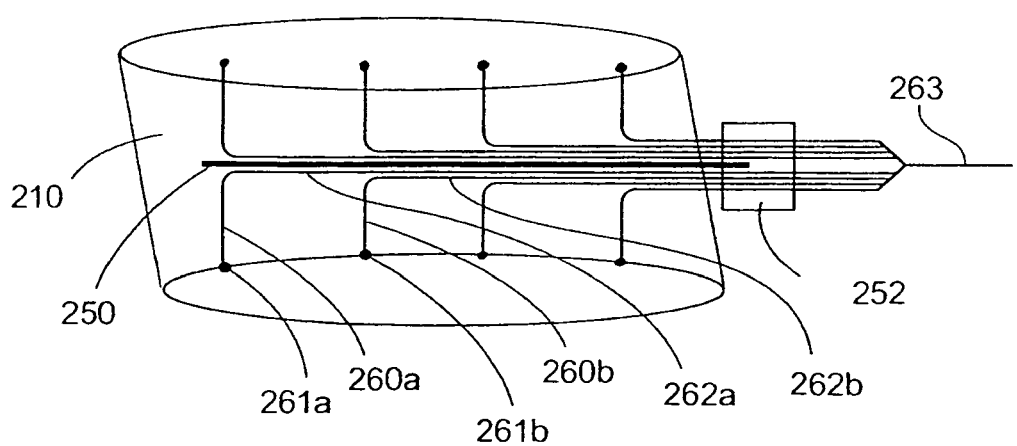
Figure 5:
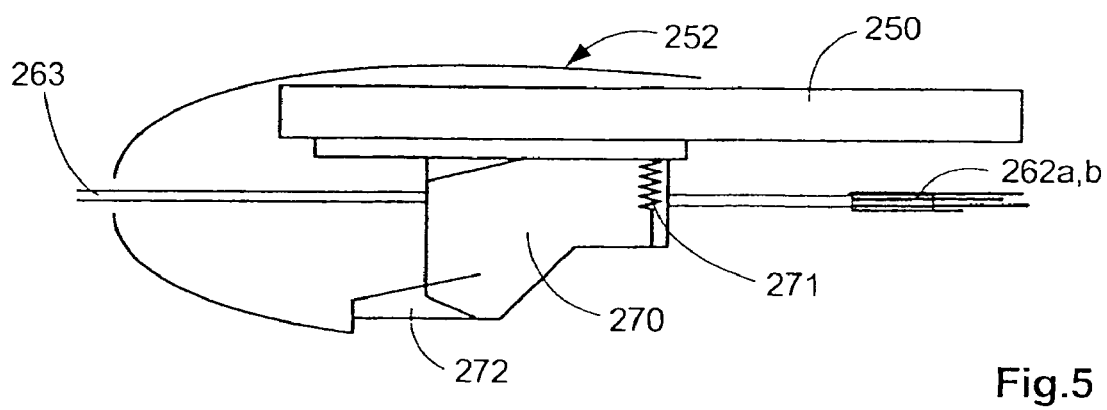
Figure 6:
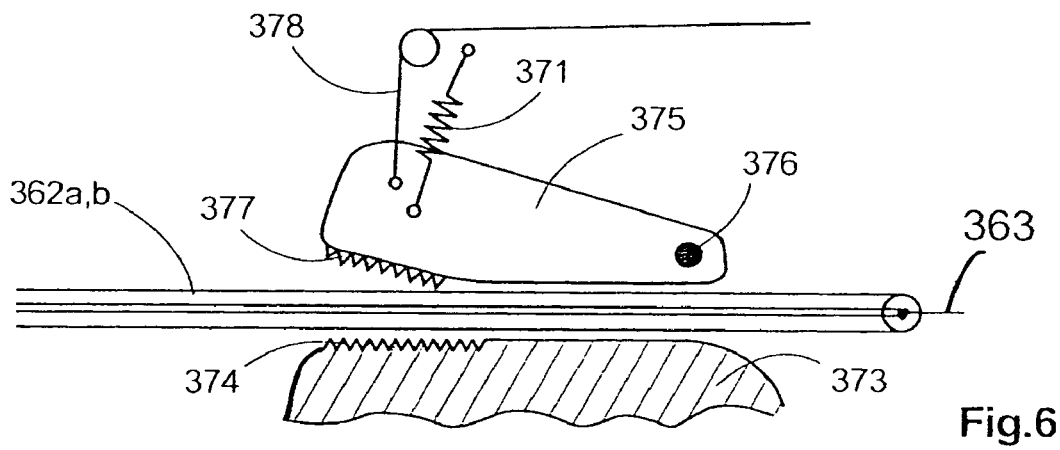
Figure 7A:
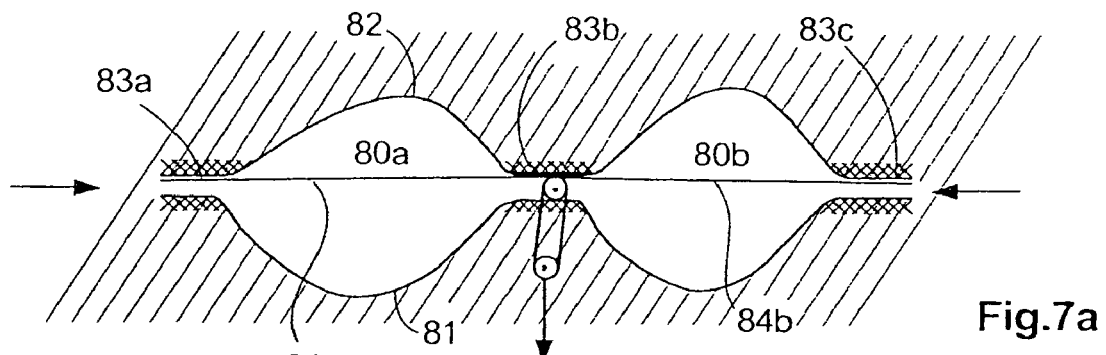
Figure 7B:
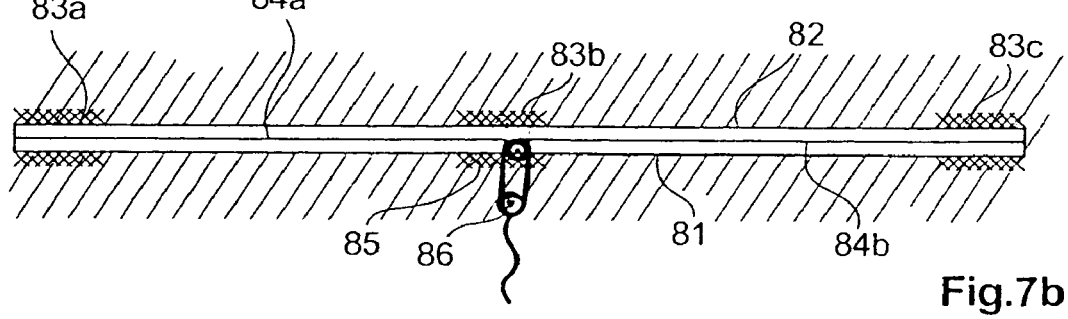
Figure 8:
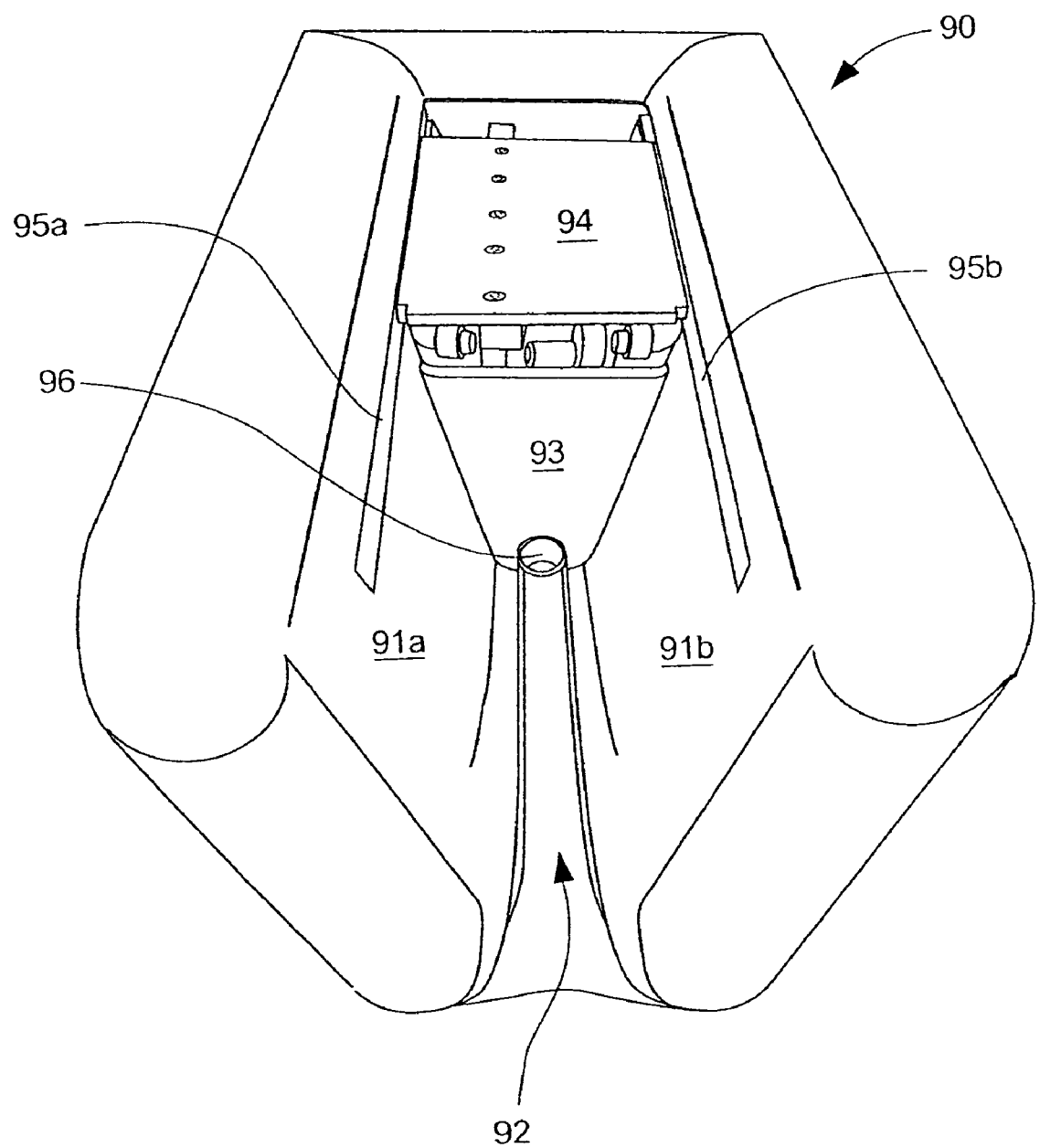
Figure 9:
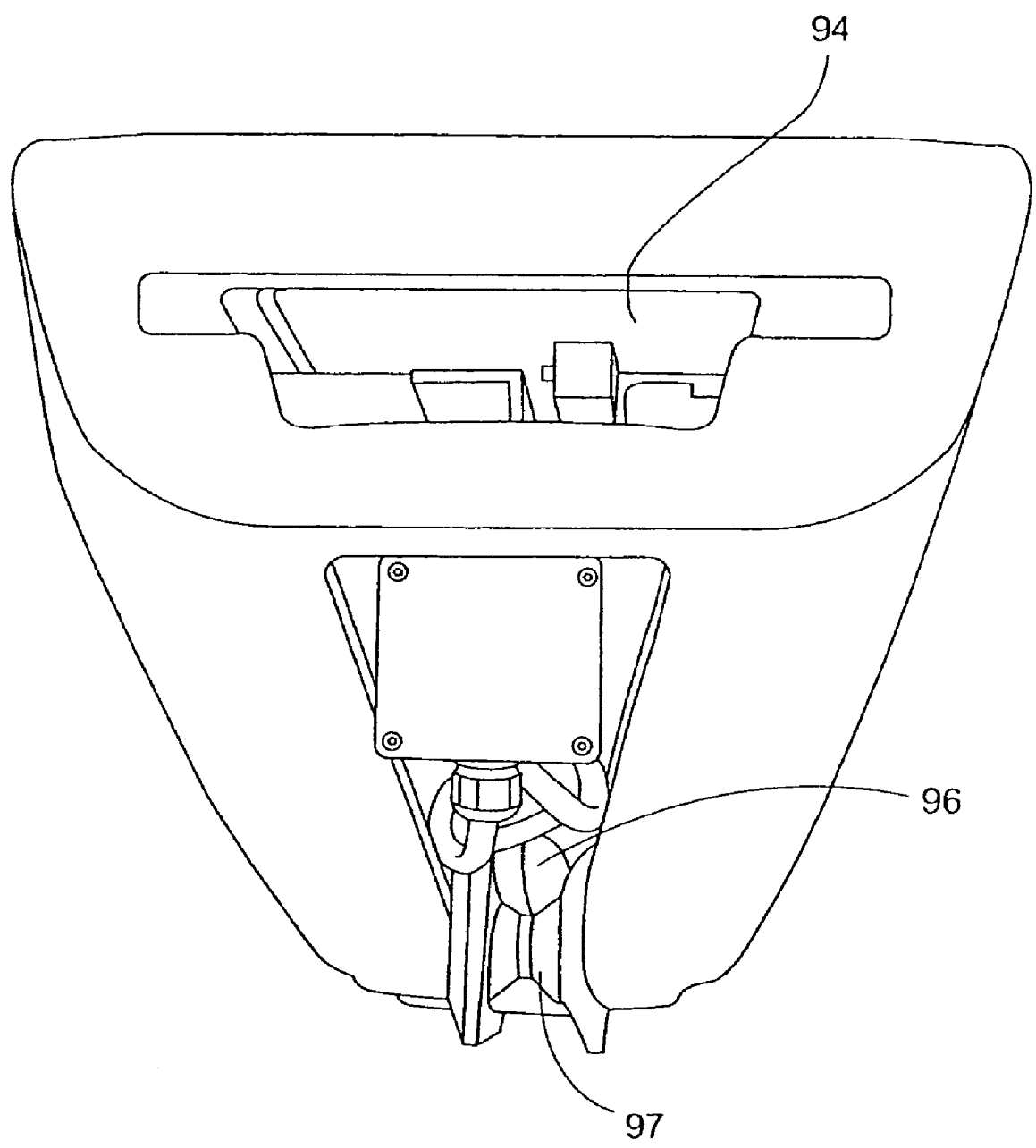
Figure 10:
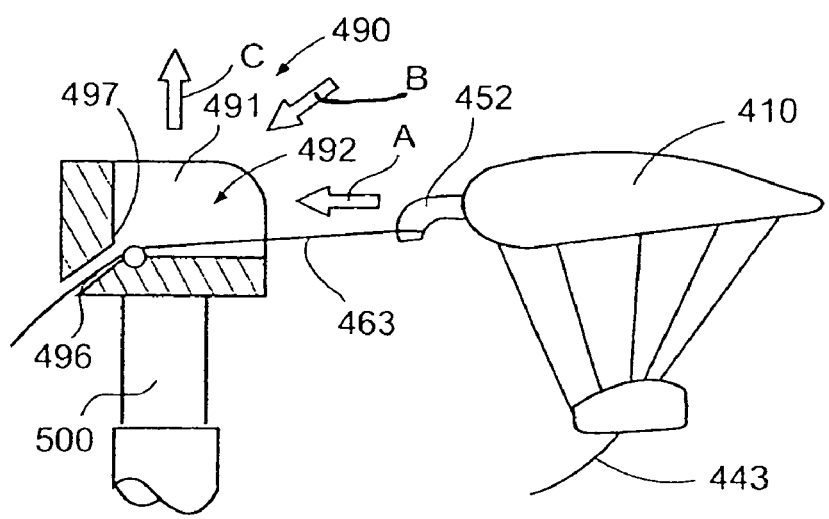
Figure 11:
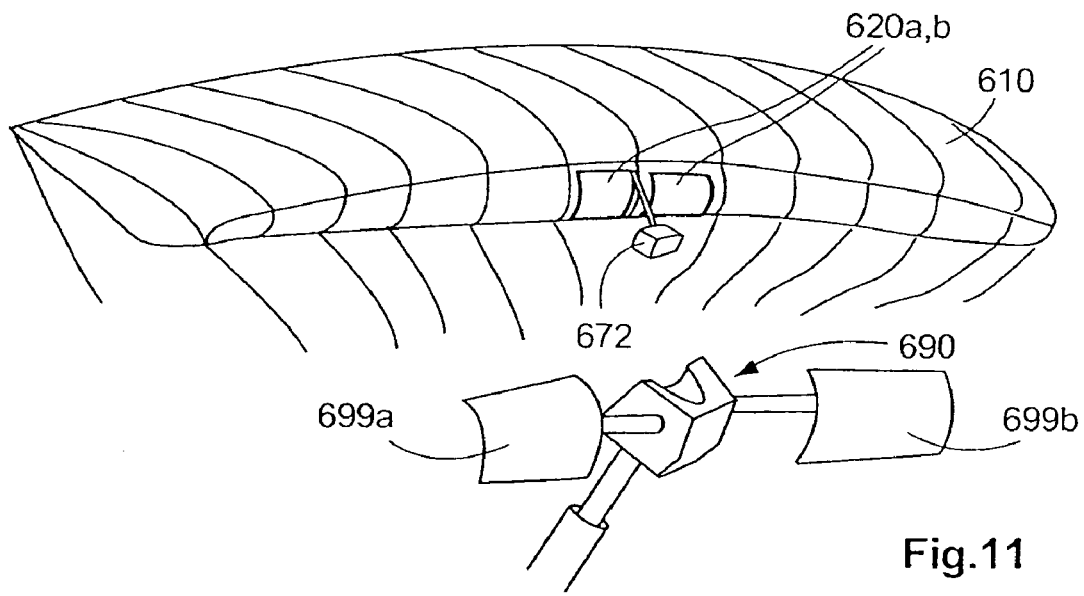
Figure 12:
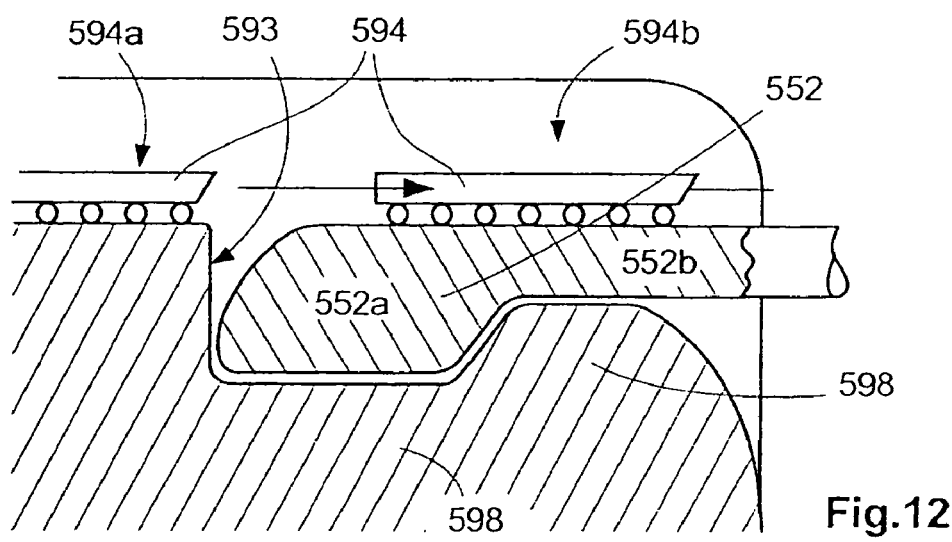
Figure 13A:
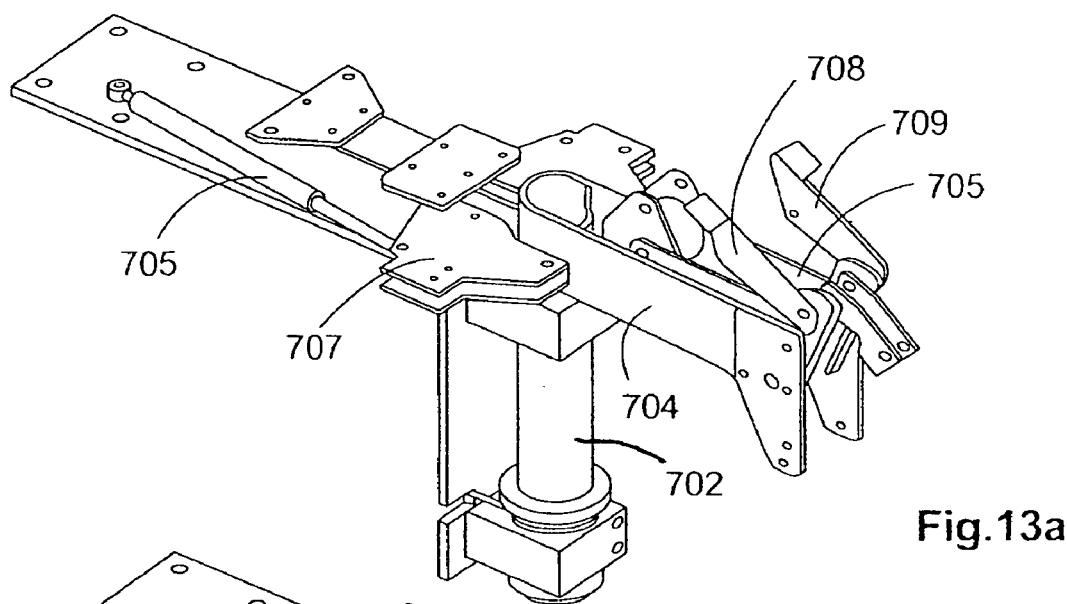
Figure 13B:
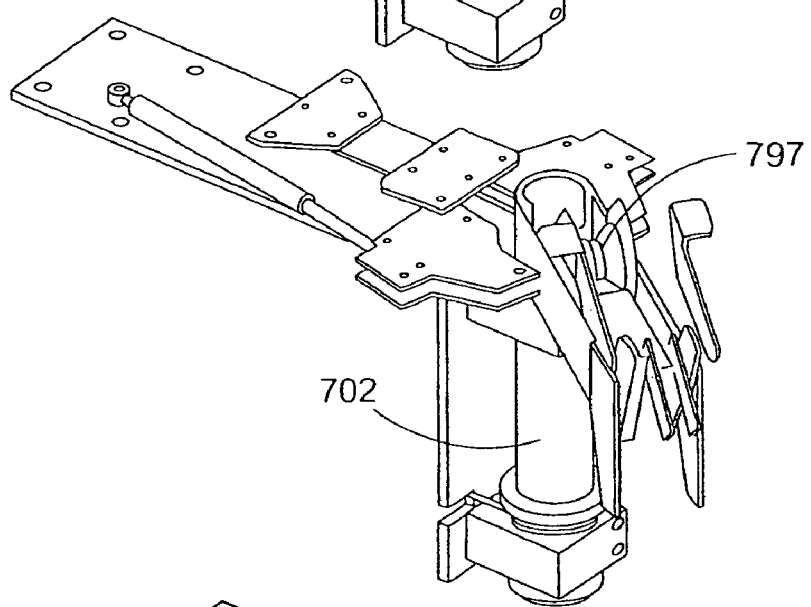
Figure 13C:
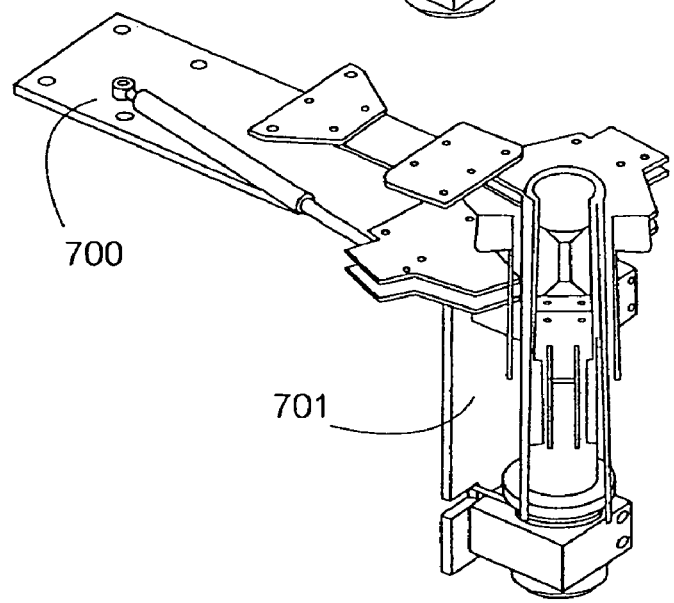

Preferred embodiments of the invention are described with reference to the accompanying Figures in which:

FIG. 1 is a front view diagrammatically illustrating the pulling line configuration of a kite according to the invention, FIG. 2 shows a side view of the kite shown in FIG. 1, FIG. 3 is a diagrammatic view of the kite with gondola and reefing line configuration inclinedly downwardly from the front, FIG. 4 is a diagrammatic view of the reefing line configuration, FIG. 5 is a diagrammatic side view of the clamping mechanism of the guide line in the front kite stick region, FIG. 6 is a diagrammatic view of the function of the clamp for the reefing lines, FIGS. 7*a* and 7*b* are diagrammatic views illustrating the functional principle of the variably closable vent openings in an open position (a) and a closed position (b), FIG. 8 is a downward view from the front of the mast head for coupling the kite to a watercraft, FIG. 9 is a view of the mast head upwardly from the rear, FIG. 10 is a diagrammatic view of the launch and retrieval procedure for the kite to and from the mast head respectively, FIG. 11 is a diagrammatic view of a further embodiment of the mast head with kite adapted thereto, FIG. 12 is a partly sectional side view of part of the mast head with inserted kite head in a locked and a non-locked position, and FIGS. 13*a*-*c* are perspective views inclinedly from the front downwardly of the mechanism for vertical and horizontal restriction of the coupling device in the mast head.

DETAILED DESCRIPTION OF THE INVENTION

Referring to FIGS. 1 and 2, an aerodynamic profile element in the form of a kite 100 according to the invention includes a first upper layer 111 and a second lower layer 112. In the front view shown in FIG. 1 it is possible to see between the leading edges 111*a* and 112*a* four openings 120*a*-*d* which serve for the intake of air into the internal space between the upper and lower layers 111, 112. The openings are arranged around the horizontal longitudinal axis of the kite. No openings are provided in the outer region between the leading longitudinal edges 111*a*, 112*a*.

The upper and lower layers are connected together by means of a plurality of webs 121. The composite arrangement which is constituted in that way, consisting of the upper and lower layers and the webs is connected to a gondola 130 by means of a plurality of pulling lines. In that arrangement, fixed to the kite is a plurality of pulling lines which are combined together in the direction of the gondola to afford collective pulling lines to such an extent that there are only six individual pulling lines which are to be fixed to the gondola.

As can be seen from FIG. 2, the profile element is also connected to the gondola in the longitudinal direction by means of a plurality of pulling lines which are combined together in the same manner to such an extent as has been described hereinbefore for the pulling lines shown in FIG. 1, which are distributed in the transverse direction.

A stiff bar element in the form of a kite stick 150 is fixed along the longitudinal centreline of the kite, between the upper and lower layers 111, 112. The kite stick 150 extends approximately over a third of the overall length of the kite. A guide line 142 is guided on the kite stick 150, the function of the line 142 being described in greater detail hereinafter.

The gondola 130 is connected to a pulling cable 143 which connects the gondola and thus the profile element to a watercraft which is to be driven by means of the kite 110. The guide line 142 is guided displaceably on the pulling cable 143 by means of a releasable sliding ring 144.

FIGS. 3 and 4 diagrammatically show the arrangement and the configuration of reefing lines for reefing and unreefing the kite. A diagrammatically illustrated kite 210 is connected by means of a plurality of pulling lines 240 to a gondola 230 which can transmit the pulling force of the kite to a watercraft by way of a central pulling cable 243.

A plurality of reefing lines extend within the kite and each have a respective portion 260*a*, *b* extending in the transverse direction of the kite. That reefing line portion 260*a*, *b* is fixed at an outer fixing point 261*a*, *b* at the outer edge of the kite. Each reefing line portion 260*a*, *b* is deflected into a reefing line portion 262*a*, *b* extending in the longitudinal direction, by means of a deflection roller 251*a*, *b* which is fixed to a kite stick 250 fixed along the longitudinal centreline of the kite. Those reefing line portions 262*a*, *b* which extend in the longitudinal direction extend to a kite head 252 fixed to the leading end of the kite stick.

In this embodiment, all reefing line portions 262*a*, *b* are connected outside the kite to a central reefing cable 263. In the illustrated embodiment, the central reefing cable 263 at the same time represents the guide cable and is guided on the pulling cable 243 by means of a releasable ring element 244.

As can be seen from FIGS. 3 and 4, the reefing line portions 260a, b do not necessarily extend exactly in the longitudinal direction of the kite 210 but can also extend in a longitudinal transverse direction. Thus, for example, the reefing line 260a is deflected at the trailing end of the kite stick 250 and fixed to the kite 210 in the rear corner region by means of the fixing point 261a. As, however, the kite stick 250 does not extend over the full length of the kite 210, but, in the illustrated embodiment, occupies only approximately two thirds of that length, the reefing line portion 260a extends inclinedly from the inside outwardly towards the rear. Accordingly, the reefing line portion 260a makes it possible to produce reefing in the longitudinal direction and in addition a reefing component in the transverse direction, when that reefing line 260a is hauled in.

FIG. 5 shows a clamping device in the region of a kite head. As will be seen, in the illustrated reefing cable and reefing line position, it is not the reefing lines but the reefing and guide cable that is guided through the kite head, contrary to the views shown in FIGS. 3 and 4.

The pulling line 263 is guided in the region of the kite head through a clamping device 270 which is fixed to the kite stick 250. The clamping device 270 is so designed that it can clamp both the pulling line 263 and also the reefing lines 262a, b, depending on the extent to which the kite 210 is reefed and consequently the position adopted by the reefing/guide line 263 and the reefing lines 262a, b relative to the clamp.

The clamping device 270 includes a tension spring 271 which holds the clamping device in a clamping condition. In other words, in the normal flight condition the clamping device is closed and thus it is not possible for the reefing/guide cable 263 to be pulled out of the kite head. In that way, in the normal flight condition, the reefing/guide cable 263 can be used to guide the kite without unwanted reefing of the kite being implemented thereby.

The clamping device can be opened by manual or automatic actuation of a lever 272. As will be described in detail hereinafter that lever can be in particular automatically actuated when the kite head is coupled to a mast head on the watercraft.

When the lever 272 is actuated the clamping device 270 is released and the reefing/guide cable 263 can be pulled out of the kite head. In that way the reefing lines 262a, b can be pulled out of the kite through the clamping device and the kite can be reefed in that way. As soon as the reefing is complete the lever 272 can be released again and the reefing state can be fixed by clamping in that way.

FIG. 6 shows an alternative embodiment of the clamping device for the reefing lines or the reefing/guide cable respectively.

The clamping device shown in FIG. 6 includes a fixed counterpart surface 373 provided with a plurality of ribs 374 which increase the friction in relation to the reefing lines or the reefing/guide cable 362a, b, 363.

Arranged in opposite relationship to the fixed counterpart surface 373 is a pivotable clamping body 375 which is supported pivotably in a rotary joint 376. The clamping body 375 is urged into the clamping position by means of a compression spring 371 and also has a plurality of ribs 377 to enhance the frictional effect, at the clamping surface which faces towards the reefing/guide cable or the reefing lines.

A clamping release line 378 is fixed to the clamping body adjacent to the pivotal mounting point for the compression spring 371 on the clamping lever 375. The clamping release line 378 is deflected and passed out of the kite head in parallel relationship with the reefing lines 363a, b. By pulling on the clamping release line 378, the clamping body 375 can be pivoted out of the clamping position and consequently the reefing lines 362a, b are released in order to perform the reefing operation. This embodiment has the advantage that it is possible to remove the clamping action by remote actuation, for example when reefing is desired and the kite head is not coupled to a mast head.

FIGS. 7a and 7b diagrammatically show a vent opening 80a, b for venting of the internal space of the kite, which can be variably opened and closed.

As can be clearly seen from FIG. 7b, the vent opening is in the form of a longitudinal slit and has two longitudinal edges 81, 82 which extend in mutually parallel relationship. Flexible slats are fitted into the longitudinal edges 81, 82. The slats are fixedly connected together at three points 83a-c.

An opening line extends parallel to the slats between the fixing point 83a and the fixing point 83b, with a first opening line portion 84a which is deflected through 90° over a deflection roller 85 and passed to a deflection roller 86.

The first opening line portion 84a is deflected through 180° at the deflection roller 86 so that it passes back to the deflection roller 85a. The returning line portion is a constituent part of a second opening line portion 82b which in turn is deflected through 90° at the deflection roller 85 and then extends between the fixing points 83b and 83c.

The first opening line portion 84a is fixed at the fixing point 83a and the second opening line portion 84b is fixed at the fixing point 83c so that the first and second opening line portions 84a, b jointly represent a line connection, which is deflected at the deflection rollers 85, 86, between the fixing point 83a and the fixing point 83c.

The second deflection roller 86 is connected to an opening pulling cable 87. That opening pulling cable 87 is not taut in FIG. 7b. When the opening pulling cable 87 is taut, as indicated in FIG. 7a by an arrow on the opening pulling cable, the opening line portions 84a, b are also tensioned and consequently the fixing points 83a, c are pulled in the direction of the fixing point 83b. The slats 81, 82 are deformed thereby and form an eight-shaped opening 80a, b through which the air in the internal space of the kite can flow out.

FIGS. 8 and 9 show a coupling device which can be fixed in the region of a mast head to the tip of a mast which is mounted on a watercraft. The mast, mast head and the coupling device serve to allow the launch and retrieval procedures for the kite. After a launch has taken place the pulling cable force of the kite is transmitted by way of a hauling point arranged at a spacing from the mast and the mast is performing no function during normal travel operation so that for example it can be of a telescopic structure and can then be retracted.

FIG. 8 shows the coupling device from above from the front. As can be seen therefrom the coupling device 90 includes a housing having side walls 91a, b which laterally delimit a receiving space. The receiving space is open upwardly and forwardly. Rearwardly, the receiving space 92 is delimited by an abutment wall 93. The side walls 91a, b converge downwardly so that a funnel shape is provided in that direction. The side walls 91a, b are also rounded at the front and upper edges. Both that rounded configuration and also the conically converging arrangement of the side walls 91a, b make it easier to introduce a kite head into the receiving space 92.

The horizontal and vertical pivoting mechanism of the coupling device is arranged behind the abutment wall 93 in the trailing region. That mechanism is described in further detail hereinafter.

Arranged above the horizontal and vertical pivoting mechanism is a locking plate 94 which is guided in guide rails 95a, b extending horizontally along the side walls 91a, b. The locking plate 94 can be moved along the guide rails 95a, b from the unlocked position shown in FIG. 10 into a locked position in which it closes the receiving space 92 from above and thus locks in position a kite head which is arranged in the receiving space.

Arranged at the bottom of the receiving space in front of the abutment wall 93 is an opening 96 which extends downwardly through the coupling device and which is arranged in such a way that it guides a guide cable or a reefing/guide cable onto a deflection roller 97, as can be seen in particular from FIG. 11. A kite head can be directed into the receiving space 92 by means of the guide cable which is threaded through the opening 96 in that way.

FIG. 10 diagrammatically shows the docking or retrieval procedure and the launch procedure for a kite 410 on a coupling device 490 arranged on a telescopic mast 500.

As indicated by the double-headed arrow A, the kite 410 with a kite head 492 at the leading end is approaching the coupling device 490 in a strong wind, in a horizontal direction. In this case the kite head 452 passes from the front into a receiving space 492. That movement is guided and assisted by a guide cable 463. The guide cable 463 is releasably fixed to the pulling cable 443 in normal flight operation and, after the pulling cable has been hauled in, removed from the pulling cable 443, passed through the opening 496 in the coupling device and can then pull the kite head 452 into the receiving space 492.

The double-headed arrow identified by B specifies the direction in which the kite head 452 is retrieved in light wind conditions. In this case it is necessary for the kite head 452 to be introduced into the receiving space 492 in a direction which is inclinedly forwardly and downwardly.

The double-headed arrow identified by C shows the direction in which the kite head 452 is typically launched. To make it easier to control the launch operation preferably takes place upwardly, that is to say in a perpendicular direction of movement.

FIG. 12 shows a sectional side view of a coupling device 590 with a kite head 552 coupled thereto. The kite head 552 includes a front portion 552a and an elongate rear portion 552b. The elongate rear portion 552b is set back at its underside with respect to the front portion 552a so that there is a step between the front and rear portions 552a, b.

The lower receiving surface of the receiving space 592 is provided at the front end with a projection 598 which is shaped in congruent relationship with the step on the kite head 552.

That configuration of the receiving space and the kite head means that the kite head can firstly pass into the receiving space in a horizontal direction of movement and then, after abutting against the abutment wall 593, can move vertically downwardly.

A locking plate 594 is shown in two positions in FIG. 14. The position 594a represents the unlocked position in which the kite head 552 can be moved into and out of the receiving space 592. Displacement of the locking plate 594 forwardly causes the locking plate to reach the locking position 594b. In that position the locking plate 594 is disposed above the kite head 552 and thus prevents the kite head from being able to move upwardly. The kite head is thus locked in the coupling device by abutting against the projection 598 with the front kite head portion 552a.

FIG. 11 diagrammatically shows a kite 610 with two air intake openings 620a, b arranged around the longitudinal centreline. The air intake openings as viewed in the longitudinal direction of the kite are arranged to the left and the right of a kite stick (not shown).

FIG. 11 further shows a coupling device 690. The coupling device includes two cover plates 699a, b which are fixed to the coupling device in such a way that, when the kite 610 is coupled to the coupling device 690, they cover over the air intake openings 620a, b. That avoids a further intake of air into the internal space in the kite 610 and thus facilitates the operation of reefing the kite 610.

An actuating lever is arranged in the region of the kite head and is coupled to a clamping device for the reefing lines or the reefing/guide cable respectively. When the profile element is coupled to the mast head the actuating lever 672 is pivoted by bearing against the mast head and releases the clamping action of the clamping device.

FIGS. 13a-c show the mechanical connecting device of the coupling device shown in FIGS. 10 and 11 on a mast. A plate 700 and a plate 701 which is arranged perpendicularly to the plate 700 are fixed rigidly to the mast.

Mounted rotatably to the plates is a rotary shaft 702 connected to cantilever arms 704, 705. Mounted rotatably to the cantilever arms 704, 705 is a deflection roller 797 which serves for deflection of the guide cable when guiding the kite head into the receiving space or out of same.

The rotary movement about the rotary shaft 702 is fixed by means of a damper element 706 which is fixed with one end to the plate 700 and with the other end to a cantilever arm 707 which in turn is fixed to the cantilever arm 704. The rotary shaft 702 thus permits a pivotal movement of the coupling device about a vertical axis.

Arranged at the front end of the cantilever arms 704, 705 is a pivoting device which permits a slight pivotal movement of two cantilever arms 708, 709 about a horizontal axis. That passive pivotability about a horizontal axis permits a certain degree of mobility for the kite in the coupled condition and thus serves to relieve the load on the kite stick when forces act on the kite, which can be caused for example by gusts of wind or movements of the ship. In addition the kite can be let down by pivotal movement about that axis.

The invention claimed is:

1. An aerodynamic profile element for energy production using traction force, in particular for driving watercraft, comprising:
    (a) an upper flexible layer which extends in a transverse direction and a longitudinal direction,
    (b) a lower flexible layer which extends parallel to the upper layer and which is connected to the upper layer by a plurality of webs extending in the depthwise direction of the profile element,
    (c) an air-filled internal space between the upper and lower layers,
    (d) at least one air intake opening for supplying air to the internal space, said opening being arranged between two mutually parallel leading edges of the upper and lower layers,
    (e) a plurality of pulling lines which are fixed with a first end to spaced locations on the profile element and which are connected with a second end to a pulling cable,
    (f) a plurality of reefing lines which are fixed at a first end to the layers and/or webs and which are adapted to reduce or increase the size of the profile element by reefing or unreefing the upper and lower layers, and (g) a bar element extending in the longitudinal direction of the profile element to stabilise the aerodynamic profile, wherein the bar element is fixed to the upper and/or lower layer, and/or to a web, and at the bar element at least one of the reefing lines has a first reefing line portion, which extends in the transverse direction of the profile element of the upper or lower layer, respectively, from the fixing point at the first end, and a second reefing line portion, which extends in the longitudinal direction.

2. A profile element according to claim 1 wherein the bar element extends only over a part of the length of the layers.

3. A profile element according to claim 1 wherein the first reefing line portion which extends in the transverse direction of the upper or lower layer, respectively, extends at least in a portion inclinedly relative to the transverse direction in such a way that when the first reefing line portion is pulled, reefing of the layers occurs in the transverse and longitudinal direction.

4. A profile element according to claim 1 wherein the first and second reefing line portions which are fixed to the profile element are connected together and are reefed and unreefed over a roller which runs at the reefing line portions and to which a common reefing line continuation is fixed.

5. A profile element according to claim 1 further comprising a central reefing cable, a first end of which is connected to a second end of each of the reefing lines, wherein the central reefing cable and/or the second end of the reefing lines extend in a direction, which is disposed in the same axis of symmetry as the transverse direction of the profile element, from the leading end of the profile element, and a second end of the central reefing cable is releasably fixed between the first and second ends of the pulling cable in such a way that the central reefing cable can serve as a guide cable for the launch and retrieval of the profile element.

6. A profile element according to claim 5 wherein the second end of the central reefing cable is connected releasably and preferably displaceably to the pulling cable by means of a coupling device.

7. A profile element according to claim 5 wherein a cable clamping device is adapted to releasably clamp the central reefing cable or the reefing lines.

8. A profile element according to claim 7 wherein the cable clamping device is self-clamping when there is a pull at the central reefing cable, is fixed to the bar element in the region of the leading edge of the profile element, and is coupled to actuating means which permit opening of the cable clamping device.

9. A profile element according to claim 1 wherein the internal space has at least one vent opening and a closure device for variably closing the at least one vent opening.

10. A profile element according to claim 9 wherein the vent opening is in the form of an elongate slit, a respective elastically deformable bar element is fixed along at least one edge of the vent opening and preferably along both edges of the vent opening, an opening cable being fixed to the two ends of the deformable bar element in such a way that when a pull is applied to the opening cable the deformable bar element is elastically curved and thereby the vent opening is opened.

11. A profile element according to claim 9 wherein the vent opening is arranged in a region which, in the flying condition of the profile element, is arranged in a lower-pressure region outside the profile element, in particular in the region between the trailing edges of the layers or in the upper layer.

12. A profile element according to claim 1 wherein the region between the leading edges of the upper and lower layers has a plurality of air intake openings around the longitudinal centreline of the profile element and is closed in the outer region.

13. A profile element according to claim 12 wherein the air intake openings occupy 10-30% of the front face or aerofoil leading edge of the aerodynamic profile element.

14. A profile element according to claim 12 wherein the air intake openings are held open by means of slats.

15. A profile element according to claim 1 wherein at least one signal device is arranged at the pulling cable.

16. A profile element according to claim 15 wherein the one or more signal devices have red and white signal elements, which are fixed to the pulling cable alternately at a spacing of about 100 meters.

17. A profile element according to claim 15 wherein the one or more signal devices are self-lighting and are inductively coupled to a current-carrying line extending in the pulling cable for energy supply.

18. A launch and retrieval arrangement for a profile element, wherein the profile element comprises (a) an upper flexible layer which extends in a transverse direction and a longitudinal direction, (b) a lower flexible layer which extends parallel to the upper layer and which is connected to the upper layer by a plurality of webs extending in the depthwise direction of the profile element, (c) an air-filled internal space between the upper and lower layers, (d) at least one air intake opening for supplying air to the internal space, said opening being arranged between two mutually parallel leading edges of the upper and lower layers, (e) a plurality of pulling lines which are fixed with a first end to spaced locations on the profile element and which are connected with a second end to a pulling cable, (f) a plurality of reefing lines which are fixed at a first end to the layers and/or webs and which are adapted to reduce or increase the size of the profile element by reefing or unreefing the upper and lower layers, and (g) a bar element extending in the longitudinal direction of the profile element to stabilise the aerodynamic profile, wherein the bar element is fixed to the upper and/or lower layer, and/or to a web, and at the bar element at least one of the reefing lines has a first reefing line portion, which extends in the transverse direction of the profile element of the upper or lower layer, respectively, from the fixing point at the first end, and a second reefing line portion, which extends in the longitudinal direction, and wherein the launch and retrieval arrangement comprises a mast, to the upper end of which is fixed a mast head, and a coupling device which is arranged at the mast head and which is rotatable about a vertical axis for coupling the leading end of the bar element to the mast head, wherein the coupling device includes a receiving space which is delimited by two vertically extending side walls, and in which the leading end of the bar element can be received and which is delimited towards a first horizontal side by an abutment wall and towards a second horizontal side which is in opposite relationship thereto and upwardly is open for the introduction of the leading end of the bar element from the side or above.

19. A launch and retrieval arrangement according to claim 18 wherein the coupling device includes a vertical axis about which the bar element can pivot in the coupled condition.

20. A launch and retrieval arrangement according to claim 19 wherein the axis is coupled to a spring element and/or a damper element for the elastic return of the coupled bar element into a reference angular orientation or for damping of the pivotal movement of the bar element.

21. A launch and retrieval arrangement according claim 18 comprising a locking device for locking the bar element in a horizontally oriented angular position.

22. A launch and retrieval arrangement according to claim 21 wherein the locking device includes a horizontally displaceable closure element which closes the upper opening region of the receiving space in a locking arrangement and opens it in an unlocking arrangement.

23. A launch and retrieval arrangement according to claim 21 wherein at least one cover flap is arranged at the mast head for covering the air intake opening of the profile element when the bar element is coupled to the mast head.

24. A launch and retrieval arrangement according to claim 21 wherein the mast is telescopically extendable and retractable and/or foldable about at least one axis.

25. A drive arrangement for a watercraft including a profile element and a launch and retrieval arrangement,
wherein the profile element comprises (a) an upper flexible layer which extends in a transverse direction and a longitudinal direction, (b) a lower flexible layer which extends parallel to the upper layer and which is connected to the upper layer by a plurality of webs extending in the depthwise direction of the profile element, (c) an air-filled internal space between the upper and lower layers, (d) at least one air intake opening for supplying air to the internal space, said opening being arranged between two mutually parallel leading edges of the upper and lower layers, (e) a plurality of pulling lines which are fixed with a first end to spaced locations on the profile element and which are connected with a second end to a pulling cable, (f) a plurality of reefing lines which are fixed at a first end to the layers and/or webs and which are adapted to reduce or increase the size of the profile element by reefing or unreefing the upper and lower layers, and (g) a bar element extending in the longitudinal direction of the profile element to stabilise the aerodynamic profile, wherein the bar element is fixed to the upper and/or lower layer, and/or to a web, and at the bar element at least one of the reefing lines has a first reefing line portion, which extends in the transverse direction of the profile element of the upper or lower layer, respectively, from the fixing point at the first end, and a second reefing line portion, which extends in the longitudinal direction;

wherein the launch and retrieval arrangement comprises a mast, to the upper end of which is fixed a mast head, and a coupling device which is arranged at the mast head and which is rotatable about a vertical axis for coupling the leading end of the bar element to the mast head, wherein the coupling device includes a receiving space which is delimited by two vertically extending side walls, and in which the leading end of the bar element can be received and which is delimited towards a first horizontal side by an abutment wall and towards a second horizontal side which is in opposite relationship thereto and upwardly is open for the introduction of the leading end of the bar element from the side or above; and wherein the mast is arranged in the bow region of the watercraft and the pulling cable is pivoted to a hauling point in the bow region of the watercraft, which in the direction of travel is arranged approximately a third of the length of the profile element in front of the mast.

* * * * *